Patented June 19, 1934

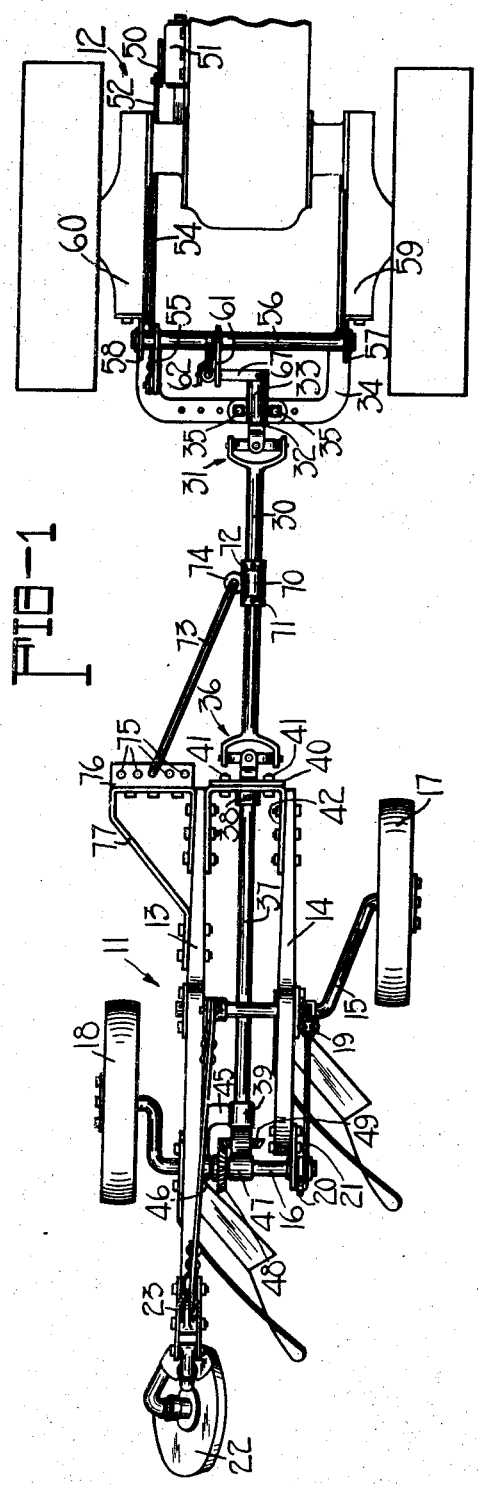

1,963,645

UNITED STATES PATENT OFFICE 1,963,645

AGRICULTURAL IMPLEMENT

Theophilus Brown, Moline, Ill., assignor to Deere & Company, Moline, Ill., a corporation of Illinois Application September 12, 1932, Serial No. 632,701

8 Claims. (Cl. 97—47)

This invention relates to agricultural implements in general, and more particularly to implements adapted to be drawn by a tractor.

In an implement designed for tractor propulsion having parts which must be adjusted from time to time it is usual to provide a lever extending from the implement to the operator's position on the tractor for effecting such adjustment. Such a lever is a source of nuisance to the operator inasmuch as it is not always within convenient reach of the operator in all positions of the implement with respect to the tractor, and furthermore may become a source of danger. When operating over irregular terrain, the implement will rise and fall rapidly with respect to the tractor and vice versa. The lever will have corresponding movement and if the operator is not watchful, it may strike him.

The main object of my invention is the provision of new and improved means for effecting an adjustment from the tractor, which means is incorporated in the draft connection between the implement and the tractor whereby the need of a lever such as described above is eliminated.

According to a preferred embodiment of my invention I accomplish this object by providing a draft connection between the implement and the tractor which not only serves as a means for pulling the implement but which itself is utilized to effect the adjustment of the implement. I mount the draft member connecting the implement to the tractor in bearings so that it may be rotated, and then utilize the rotation thereof to effect the adjustment of the implement through suitable connections with the ends of the draft member.

Another object of my invention is the provision of a power device on the tractor operated from the motor of the tractor and connected with the implement adjustment control device, whereby the adjustment of the implement may be effected by power derived from the motor of the tractor.

Other and further objects will appear from the following detailed description of preferred embodiments of my invention illustrated in the accompanying drawing in which:

Figure 1 is a plan view of a plow drawn by a tractor illustrating one form of the invention wherein the draft member connects the implement with the tractor and not only transmits draft to the implement but is rotatable to effect an adjustment of the implement; and, Figure 2 is a side elevational view thereof.

In Figures 1 and 2 is shown a plow 11 connected to the tractor 12. The plow 11 comprises a pair of plow beams 13 and 14 rigidly connected together and mounted on a pair of crank axles 15 and 16. Furrow wheel 17 is journaled on the crank portion of axle 15, and a land wheel 18 is journaled on the crank portion of axle 16. Crank arms 19 and 20 are fixed to crank axles 15 and 16, respectively. These arms are connected together by means of an adjustable link 21 through which connection the two crank axles are rocked simultaneously.

A rear furrow wheel 22 is also provided which is connected to the rear end of beam 13 through suitable lift connections 23. These connections include a link 24 connected to arm 25 fixed to crank axles 15 through which connection the rear portion of the frame is lifted relative to wheel 22 simultaneously with the cranking of axles 15 and 16.

Plow 11 is drawn by the tractor 12 through a connection comprising a draft member 30. Member 30 is connected by means of a universal joint 31 with a rockable member 32 journaled in a bearing 33 fixed on the drawbar 34 of the tractor by means of bolts 35. At its rear end draft member 30 is connected by means of universal joint 36 with the forward end of a shaft 37 journaled in bearings 38 and 39. Bearing 38 is carried by a bracket 40 which is adjustably supported by means of bolts 41 to the U-shaped frame member 42 connected between the front ends of beams 13 and 14. Bracket 40 is arcuate shaped, the center of curvature thereof being the axis of axle 16. Bearing 39 is formed integral with U-shaped bracket 45. This bracket is journaled on axle 16 through bearings 46 and 47 formed integral with the bracket. Between the arms of bracket 45 a bevel gear 48 is keyed to shaft 16. This gear meshes with a bevel gear 49 fixed to the end of shaft 37. Through this power connection of draft member 30 with axle 16, axle 16 is rocked by the rotation of draft member 30, thereby raising or lowering the plow relative to the supporting wheels depending on the direction in which draft member 30 is rotated.

Draft member 30 is rotated by power derived from the motor of the tractor through connections with the crank 50 of the half revolution power lift mechanism 51 of the tractor. Power lift mechanism 51 may be like that shown and described in detail in the Brown and Murray application, Serial No. 399,980 filed October 16, 1929. These connections include a link 52 connected between the end of crank 50 and a swinging member 53 which member is connected by means of a link 54 to the end of an arm 55 fixed to rock shaft 56 supported in bearings 57 and 58 fixed to the ends of driving chain housings 59 and 60 of the tractor. Another arm 61 is fixed to shaft 56. Between the ends of arm 61 and a bracket 62 fixed to one side of the arm, a nut 63 is pivotally supported. A threaded rod 64 is screwed into nut 63. This rod carries a crank 65 at its upper end and at its lower end is swivelly connected with a bracket 66 which in turn is pivoted to the end of an arm 67 fixed to the forward end of rockable member 32.

To hold the draft member 30 against any angular movement in a horizontal plane relative to the plow 11, a connection is provided between the draft member 30 and the plow frame comprising a collar 70 journaled on the draft member 30 between collars 71 and 72 fixed on the draft frame. A link 73 is connected at one end to an eye 74 formed integral with collar 70 and at its opposite end is pivotally supported in one of the holes 75 provided in bracket 76 carried by frame member 77 fixed to the outer side of beam 13. Through the provision of a plurality of holes 75, draft member 30 may be positioned in longitudinal alignment with the plow 11 or in an angular position with respect thereto to offset the plow in one direction or the other with respect to the tractor. Holes 75 are disposed in substantially transverse alignment with universal joint 41 as a result of which the angular position of draft member 30 horizontally is not affected by the vertical movements of draft member 30 with respect to the plow 11 about a transverse horizontal axis.

To raise the plow from a lowered position or vice versa, the operator need merely initiate the operation of the power lift mechanism 51 in the usual manner. This causes a rocking of shaft 56 which in turn rocks the rockable member 32. This causes a partial rotation of draft member 30 and a corresponding rotation of shaft 31 which in turn through bevel gears 46 and 47 causes a rocking of axle 16 and a consequent raising or lowering of the plow relative to wheels 17, 18 and 22. By rotating the crank 65 the depth at which the plow is lowered may be adjusted.

From the above it will be seen that I have provided a connection between the implement and the tractor comprising a single draft member 30 which not only functions to transmit draft from the tractor to the implement, but also by the rotation thereof effects an adjustment upon the implement which in this case is the raising and lowering of the plow, and that I have provided a power device operated from power derived from the motor of the tractor for rotating the draft member 30.

What I claim, therefore, and desire to secure by Letters Patent is:—

1. In combination, a tractor, an implement, means supporting said implement and relative to which said implement may be raised to inoperative position, a draft member connecting the implement with the tractor through which drawing force is transmitted from the tractor to the implement, said draft member being rotatable with respect to said implement, means for raising said implement to inoperative position, said means being operable by the rotation of said draft member and means on the tractor for rotating said draft member.

2. In combination, a tractor, an implement, a rotatably mounted draft member connecting the implement with the tractor through which the tractor propels the implement, the connection of the draft member with the tractor including a universal joint, an operating mechanism on the implement connected with said draft member to be operated thereby by the rotation thereof, and means on the tractor for rotating said draft member.

3. In combination, a tractor, an implement, a rotatably mounted draft member connecting the implement with the tractor through which the tractor propels the implement, the connection of the draft member with the tractor including a universal joint, an operating mechanism on the implement connected with said draft member to be operated thereby by the rotation thereof, a rock shaft on the tractor, means for rocking said shaft by power derived from the tractor motor, and connections between said rock shaft and said draft member whereby the rocking of said rock shaft rotates said draft member.

4. In combination, a tractor, an implement, a shaft journaled on the implement, a rotatably mounted draft member connecting the implement with the tractor, said member being connected with said shaft and constituting the sole means for the transmission of draft to the implement for pulling the same, mechanism on the implement operated by the rotation of said shaft, and means on the tractor for rotating said draft member.

5. In combination, a tractor, an implement, a shaft journaled on the implement, mechanism on the implement operated by the rotation of said shaft, a rockable member on the tractor, a rotatably mounted draft member between the tractor and the implement, a universal joint connecting one end of said draft member with said rockable member, a second universal joint connecting the other end of said draft member with said shaft, and means on the tractor for rocking said rockable member.

6. In combination, a tractor, an implement, a shaft journaled on the implement, mechanism on the implement operated by the rotation of said shaft, a rockable member on the tractor, a rotatably mounted draft member between the tractor and the implement, a universal joint connecting one end of said draft member with said rockable member, a second universal joint connecting the other end of said draft member with said shaft, and means on the tractor for rocking said rockable member, a bearing for said shaft disposed adjacent said second universal joint, said bearing being adjustably supported on the implement to adjust the position of said shaft vertically.

7. In combination, a tractor, an implement, a shaft journaled on the implement, mechanism on the implement operated by the rotation of said shaft, a rockable member on the tractor, a rotatably mounted draft member between the tractor and the implement, a universal joint connecting one end of said draft member with said rockable member, a second universal joint connecting the other end of said draft member with said shaft, means on the tractor for rocking said rockable member, a collar journaled over said draft member, and a tie member connected to said collar and pivotally connected to the implement at a point in substantially transverse alignment with said second universal joint.

8. In combination, a tractor, an implement comprising a frame and a crank axle supporting the frame and by the rocking of which said frame is raised and lowered, a bracket journaled on said axle, a longitudinal shaft journaled in bearings, one of said bearings being carried by the bracket, the other bearing being adjustably mounted on the frame for vertical adjustment, a rockable member on the tractor, a rotatably mounted draft member connected by a universal joint to the front end of said shaft and by a second universal joint to said rockable member, means on the tractor for rocking said rockable member, and power transmitting means operatively connecting said longitudinal shaft with said crank axle.

THEOPHILUS BROWN.